United States Patent [19]
Flinth et al.

[11] 3,734,217
[45] May 22, 1973

[54] WEIGHING DEVICE

[75] Inventors: Rune Nils Allan Flinth; Nils Boran Ahl; Lars Herbert Larsson; Kjell Helge Nordström, all of Vasteras, Sweden

[73] Assignee: Trancon AB, Vasteras, Sweden

[22] Filed: Sept. 16, 1971

[21] Appl. No.: 181,171

[30] Foreign Application Priority Data

Sept. 21, 1970 Sweden..............................12804/70

[52] U.S. Cl................................................177/163
[51] Int. Cl. .............................................G01g 21/22
[58] Field of Search....................177/136, 134, 163, 177/210

[56] References Cited
UNITED STATES PATENTS

| 3,356,170 | 12/1967 | Cory et al. | 177/163 |
| 1,913,915 | 6/1933 | Broscombe | 177/134 |
| 3,092,195 | 6/1963 | Von Petery | 177/163 |

FOREIGN PATENTS OR APPLICATIONS

| 422,366 | 4/1967 | Switzerland | 177/163 |

Primary Examiner—George H. Miller, Jr.
Attorney—Yount & Tarolli

[57] ABSTRACT

A device for static or dynamic weighing of railway guided vehicles comprising a vehicle engaging platform adapted to engage the wheels of the vehicle and a plurality of load sensing devices supporting the platform on the rails with a portion of the supporting platform replacing a portion of the rails.

22 Claims, 20 Drawing Figures

PATENTED MAY 22 1973 3,734,217

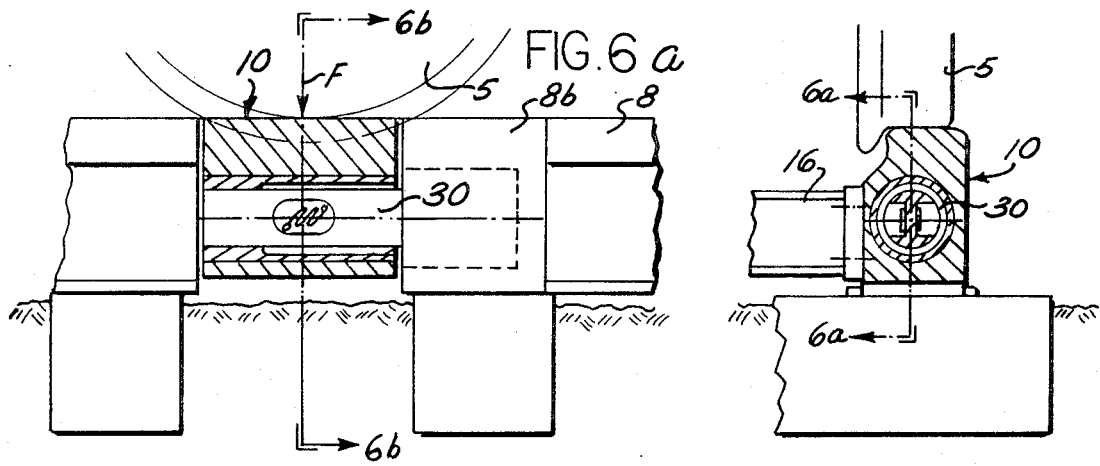
FIG. 6a
FIG. 6b
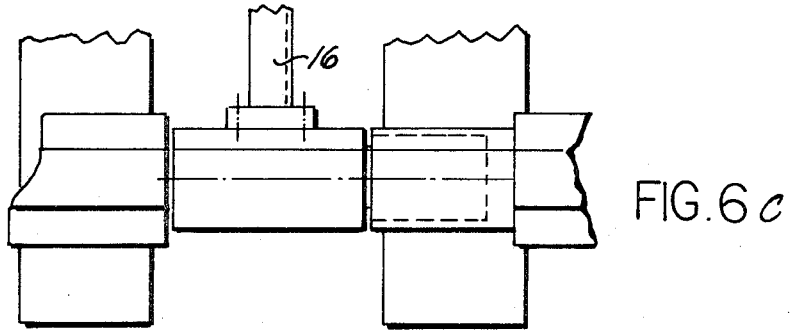
FIG. 6c
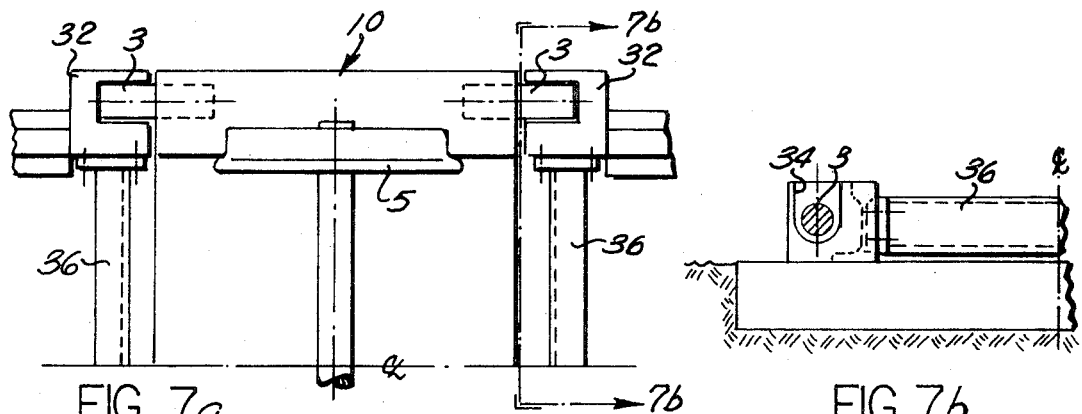
FIG. 7a
FIG. 7b
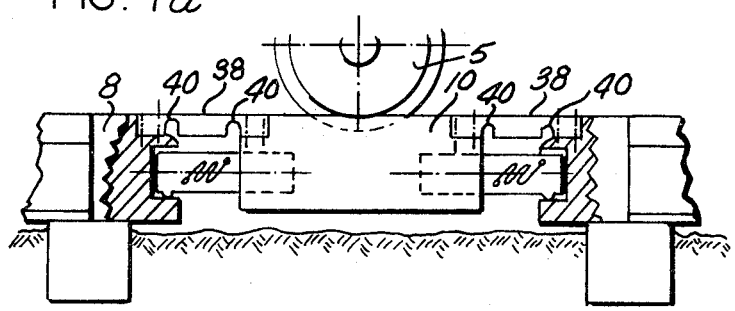
FIG. 8

WEIGHING DEVICE

This invention relates to weighing devices and, more particularly, to a device for the static or dynamic weighing of railway guided vehicles.

It is well known that weighing of railway guided vehicles can be accomplished by means of stationary platform scales which are arranged in weighing pits in the path of the vehicle. One example of such a scale is disclosed in a pamphlet published by Toledo Scale Corporation, Toledo, Ohio, and entitled "Toledo Steel Master Levers." Typical of such arrangements is the provision on the upper surface of the platform of a rail of some kind as, for example, a channel beam for a vehicle having rubber wheels or a rail in the case of railway cars. In either instance, the wheel engaging surface of the rail carried by the platform is in the same plane as the corresponding surface on the fixed ground supported rails adjacent to the scale but the platform rails are disconnected from the ground supported rails by an open joint at either end so that the rail section carried by the platform scale is free to move vertically. In such arrangements, the load resting on the scale may be sensed by various means such as, for example, a mechanical weighing system or by the use of load cells.

Typical examples of prior art systems for weighing railway cars may be found in U.S. Pat. Nos. 3,004,152, 3,085,642, and 3,159,227; British Pat. Nos. 820,969, 797,161, and 832,389; German Pat. No. DBP/ 1,079,338; French Pat. Nos. 1,292,587 and 974,974; and Swedish Pat. No. 217,810. Systems such as those disclosed in the aforementioned patents have several drawbacks. For example, the usual requirement of a stiff solid support for the scale has resulted in the use of massive expensive scale foundations. Obviously, such foundations require a permanent or stationary installation which precludes any possibility of transporting the scale from one weighing site to another. Moreover, when high weighing accuracy is needed, these foundations have had to be very deep and long and the weighing devices themselves have normally been provided with force shunting tiebars, guides, membranes or other similar devices. In using such force shunting devices, they must be so designed that they are capable of withstanding the full range of potential horizontal loads with the result that the bending stresses or frictional forces inherent in such devices become a significant factor in obtaining the desired weighing accuracy. Moreover, the problem is componded by the fact that the force shunting resulting from these bending stresses or frictional forces is not constant, but rather, varies due to many different factors including variations in the elastic movement between the supporting surface of the load cells and variations in the deflection of the load carrying surface due to the different placements of the load on that surface.

Other types of weighing devices for railway guided vehicles, such as shown for instance in Swedish Pat. No. 217,810 or British Pat. No. 797,161, utilize force shunting entrance rails which introduce a relatively large force shunting effect and which varies as wear occurs in the rails.

The problem of obtaining accurate weighing of a railway vehicle is further componded when the vehicle is to be weighed while in-motion. In particular, rails under load of a moving vehicle exhibit two properties which cause considerable problems in achieving the desired weighing accuracy. Because the rail, and its supporting ties, flexes or deflects under the wheel load, the train normally moves on a somewhat lower level than the nominal level defined by the wheel engaging surface of the unloaded rail. At the same time, oscillations in the vertical plane are produced due to the deflection of the rail between the adjacent supporting ties. When the train passes over a weighing device which utilizes a large massive rigid foundations, the elastic properties of the relatively rigidly supported platform rails are substantially different from the elastic properties of the ground supported rails. The vehicle thus experiences a sudden stiffening of the rail support which substantially reduces the flexing of the rails and entirely eliminates the oscillations due to the deflection between ties with the result that the train is "lifted-up." This, in turn, causes uncontrolled changes in the vertical forces acting on a train as it is being weighed while in-motion.

The problem of a sudden lift in the train can be reduced if the scale foundation is extended in both directions along the track and the foundation is gradually softened or weakened toward its ends so that a gradual transition is provided between the rail supported on the ties and the rails supported on the rigid foundation. However, such a solution to the problem obviously substantially increases the expense of the weighing installation and even further prevents any transportability of the weigh device.

It is a principal object of this invention to provide a weighing system for railway guided vehicles which overcomes the foregoing problems, as well as others, encountered with the prior art systems and which is capable of achieving weighing accuracy equal to or exceeding the accuracy of known stationary systems.

It is a further object of this invention to provide a weighing system for railway guided vehicles which may be used either for static or dynamic weighing of the vehicles.

Still another object of this invention is to provide a weighing system for railway guided vehicles which eliminates the need for massive foundation supports and which overcomes the problems encountered through the use of such supports.

Still a further object of this invention is to provide a weigh device for railway vehicles which can be easily installed on site without the need for test or calibrations thereby reducing the cost of installation and eliminating the need for highly technical personnel in making the installation.

These objects, as well as others, are achieved in the present invention by a weigh device comprising a vehicle supporting platform adapted to engage and support the vehicle and load sensing means interconnecting the platform and the rails so that the weigh device becomes an integrated part of the rail system and is entirely independent of any separate foundation or other rigid support, the elastic properties of which would be different than the properties of the rails. With this arrangement, the weigh device is permitted to follow the movement of the rails thereby eliminating any differences in the height between the weigh device and the rail. Moreover, the support and construction of the weigh device is such that one rail may deflect in a different manner than the other rail without any adverse affect on the weigh device so that the weigh device follows the movements of the rails both collectively and individually while at the same time assuring a properly defined loading of the load sensing means which is independent of the flexing of the rails and the rail supports.

In the preferred form of the invention, the vehicle supporting platform comprises a pair of rails which are adaptable to replace a section of the normal rails with the weigh rails being connected to the normal rails by the load sensing devices. In this manner, the vehicle passes directly from the normal rail to the weigh rails without any change in elevation of the vehicle and without any change in the elasticity of the support for the rails.

Other objects, features and advantages of the invention will be more apparent from a complete reading of the following description which, together with the attached drawings, discloses but a few preferred forms of the invention.

Referring now to the drawings wherein like reference numerals indicate like parts in the various views:

FIG. 2b is a sectional view along line 2b of FIG. 2a.

FIG. 2c is a top plan view of the modified form of the invention shown in FIG. 2a.

FIG. 3b is a plan view of the modified form illustrated in FIG. 3a.

FIG. 6a is a sectional view along line 6a of FIG. 6b and illustrates still a further modification of the invention.

FIG. 6b is a sectional view along line 6b of FIG. 6a.

FIG. 6c is a partial top plan view of the embodiment of FIG. 6a.

FIG. 7a is a partial top plan view of a still further form of the invention.

FIG. 7b is a sectional view along line 7b of FIG. 7a.

FIG. 8 is a side elevation view, partially in section, of a modified form of the invention using transitional rails.

FIG. 9b is a sectional view along line 9b of FIG. 9a.

Figure 10A:
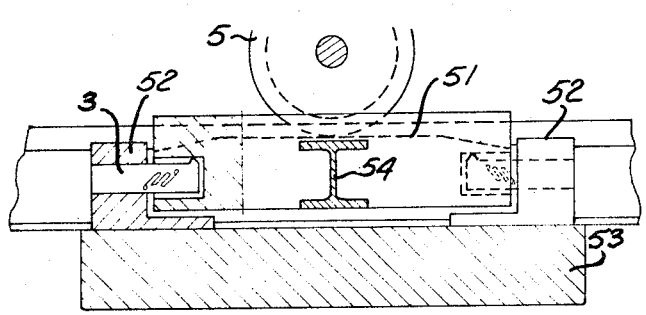
Figure 10B:
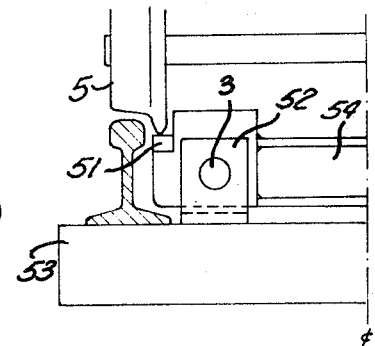
Figure 10C:
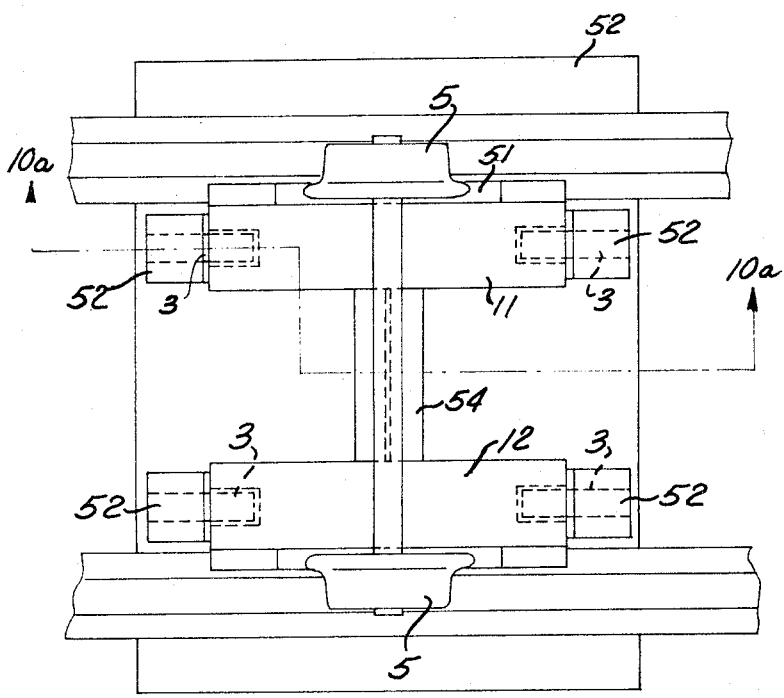

FIGS. 10a–c illustrate another form of the invention.

Figure 1A:
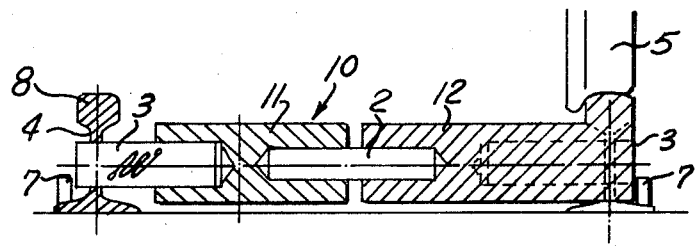
FIG. 1a is a sectional view along line 1a of FIG. 1b and illustrates the device according to the invention installed in a rail system.
Figure 1B:
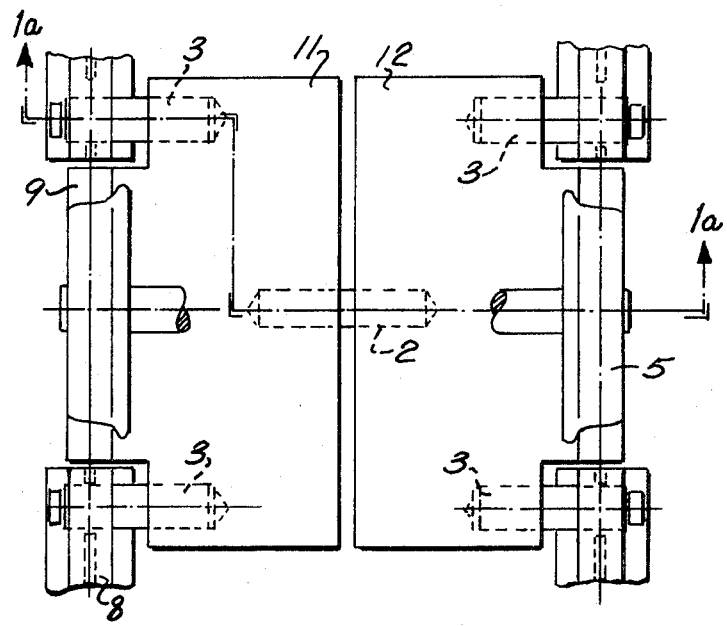
FIG. 1b is a top plan view of the device constructed according to the invention and installed in a rail system.

Referring now more in detail to the drawings, FIGS. 1a and 1b illustrate a weighing device 10 constructed according to the invention and which comprises a vehicle supporting platform consisting of two platform members 11, 12 interconnected at their midpoints by a rotatable pin 2. A plurality of load cells 3, one at each corner of the platform, support the platform on the rails. More particularly, recesses 4 are provided in the web of the rails with one end of the load cells 3 being positioned in the recesses and the other end of the load cells being received in similar recesses in the platform members 11, 12. As is apparent, the load cells, which are arranged substantially at right angles to the longitudinal axes of the rails 8, are substantially cylindrical in shape and are of a shear force sensing bending beam type which is well known in the art.

To accommodate longitudinal expansion and contraction of the rails, it is contemplated that one of the openings 4 in each rail will be of an oval configuration so that the rails 8 may shift in the longitudinal direction under the effects of temperature changes without affecting the load cells. To limit the movements of the weigh device in the transverse direction, suitable stops 7 may be provided on the upper part of the support flange or foot 6 of the rails with the stops cooperating with the ends of the load cells 3.

The lateral edge of each of the platform members 11, 12 includes a weigh rail 9 with the weigh rails being positioned in a suitable recess or cut-out in the normal rails 8. The weigh rails 9 are adapted to be longitudinally and transversely aligned with the rails 8 so that the vehicle wheel 5 moves smoothly from the ground supported rail, across the weigh rails 9 and back on to the ground supported rails.

With the described weigh device, it will be noted that the weigh device 10 is supported solely by the rails 8. Accordingly, any deflection or oscillation of the rails 8 as a vehicle passes therealong is correspondingly transmitted to the weigh device and the weigh rails 9 so that as a vehicle passes on to the weigh rails the vehicle experiences no sudden change in the elasticity or rigidity of the rail support. Moreover, because of the rotatably connected separate platform members 11, 12, the weigh device can tolerate a situation in which the support for one rail is less rigid or more flexible than the support for the other rail. For example, suppose the support under the ties supporting the rail adjacent the upper right hand load cell 3, as viewed in FIG. 1b, have deteriorated and permit that section of the rail to deflect downward as the vehicle passes thereover. This downward deflection of the rail will cause the right rail to have a slope different than the slope of the left rail and will, of course, carry with it the load cell 3. However, this difference in slope is readily accommodated by the rotatable connection provided by the pin 2 which enables the right hand platform member 12 to pivot relative to the left hand platform member 11 so that the load applied to each particular load cell remains perfectly defined and an accurate load reading is obtained.

Figure 2A:
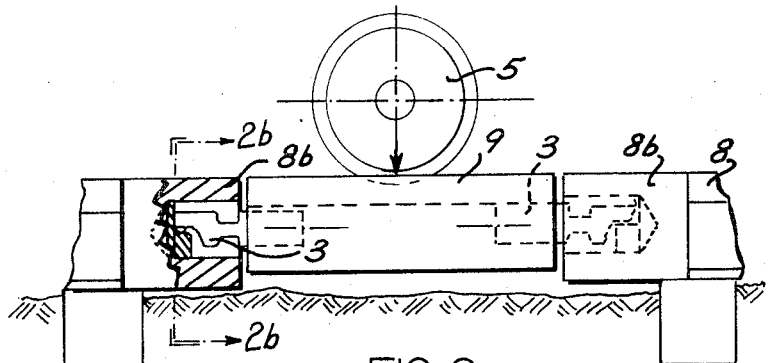
FIG. 2a is a side elevation view, partly in section, taken along the line B—B of FIG. 2c and illustrates a modified form of the invention.
Figure 2B:
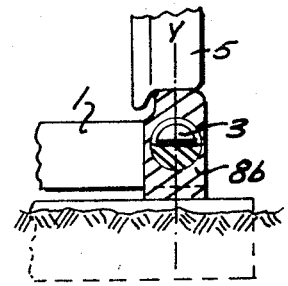
Figure 2C:
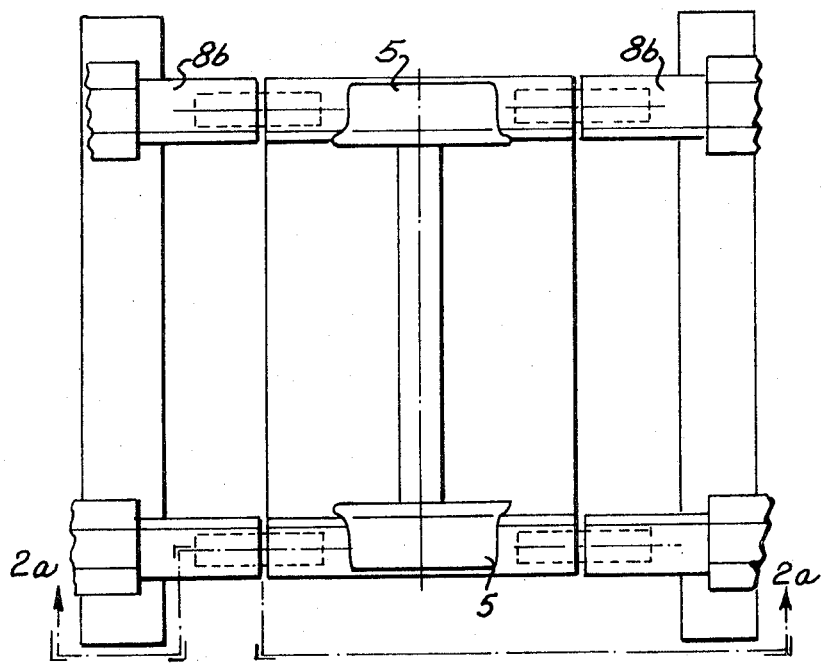

Referring now to the embodiment of FIGS. 2a–c, essentially the same arrangement is employed, except that the load cells are arranged parallel to the longitudinal axes of the track 8. As in the embodiment of FIG. 1, the load cells may be of a shear stress sensing type or a bending stress sensing type. To provide the necessary support for the load cells, the adjacent ends 8b of the rails 8 have been suitably reinforced and shaped as shown in FIG. 2a. It is usually desirable that the load cells be supported on the rails in the neutral zone y—y of the rails (FIG. 2b) although it is possible to locate the load cells offset from that zone in a manner which will be discussed hereinafter.

Figure 3A:
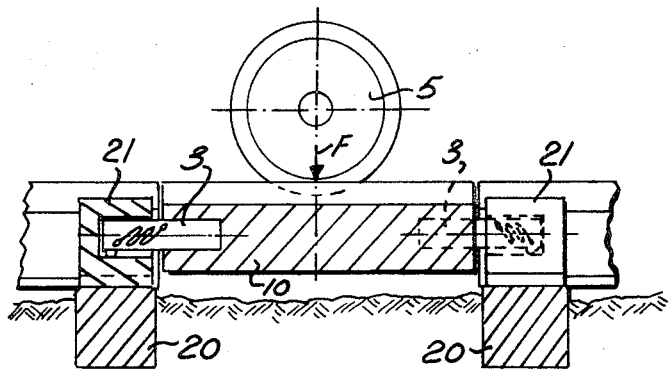
FIG. 3a illustrates a further modified form of the invention and is a sectional view along line 3a of FIG. 3b.
Figure 3B:
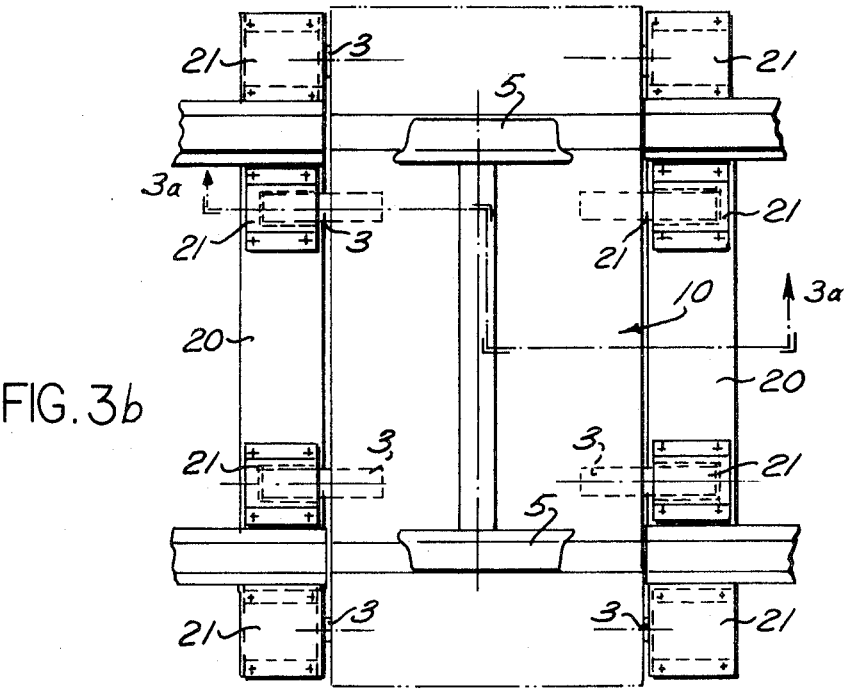

A further modified form of the weigh device is illustrated in FIGS. 3a and 3b. As shown in those figures, the weigh device utilizes load cells arranged generally parallel to the rails 8 but with the load cells being supported on members 21 carried by the supports 20 for the rails. As shown in FIG. 3b, the weigh platform extends outside of the rails and load cells 3, both inside and outside of the rails 8, are used to support the weigh device. This arrangement is not preferred since the weigh device is not connected to the rails and is, therefore, not fully integrated into the rail system. However, if the supports 20 are supported and constructed such that they move as a unit with the rails, this arrangement would be entirely satisfactory.

Figure 5:
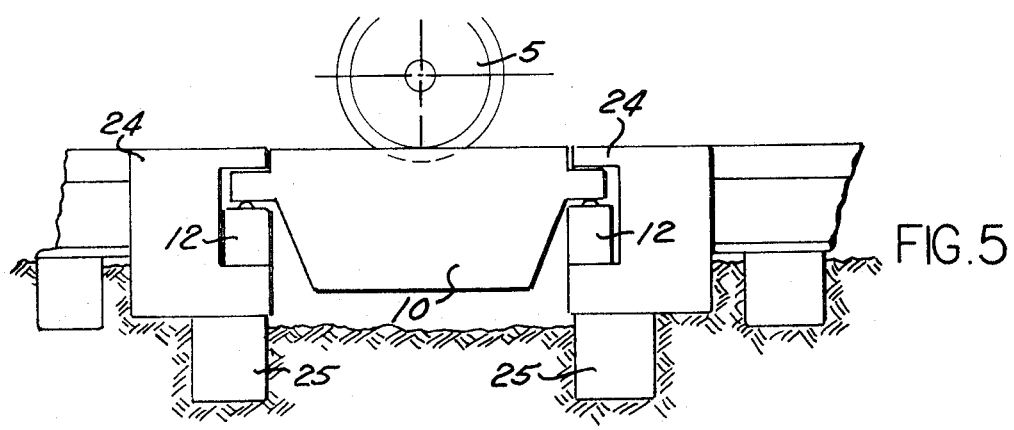
FIG. 5 is a side elevation view of another modified form of the invention.
Figure 4:
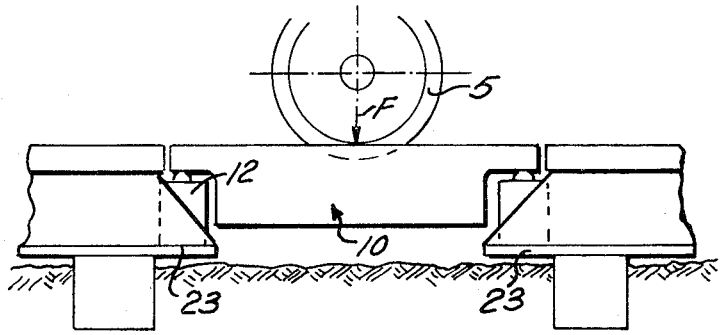
FIG. 4 is a side elevation view of a further modified form of the invention.

In FIG. 4 there is illustrated an arrangement in which load cells 12 of a compression type are used. In that FIGURE, the load cells 12 are supported on an appropriate supporting surface 23 carried by the rails with the platform resting on the load application points of the load cells. A similar arrangement is illustrated in FIG. 5 but in which the load cells are supported on reinforced end pieces 24 which, in turn, rest on ties 25 recessed into the ground.

Illustrated in FIGS. 6a–c is an arrangement in which the load cells are associated with only one of the two opposing rail ends. Thus, each lateral edge of the weigh platform is supported by a single load cell 30. With this cantilevered arrangement, it is preferred to use a shear stress sensing load cell of the type which operates on the principle of a bending stressed beam. This type of load cell has the advantage that it is essentially independent of where the load represented by the vehicle wheel is applied. To protect the load cells 30 against twisting moments caused, for example, by horizontal side forces at right angles to the rails, the load platforms are preferably connected by a suitable transverse connection 16.

FIG. 7a and 7b illustrate an arrangement in which the load cells are offset from the neutral axes of the rails 8. In this arrangement, the reinforced ends 32 of the rails 8 which support the load cells 3 have an open U-shaped recess 34 in which the load cells are received and which permits the weigh device to be readily removed in the event it is desired to do so. To minimize twisting torque stresses which, due to the offset of the load cells 3 would impose undesirable moments on the rails 8, cross-connections 36 are employed to interconnect the rails 8.

FIG. 8 illustrates a system very similar to that illustrated in FIGS. 2a–c, but in which transition joints in the form of transition rails 38 have been provided to assure a smooth movement of the vehicle wheel 5 on to the weigh device. The transition rails 38 are provided with suitable cut-outs 40 with a relatively stiffened midsection which produce an elastic, essentially friction free, joint between the transition rails and both the weigh device and the rails 8. Because of the elastic, friction free joints, the transition rails 38 introduce only an insignificant force into the system and the weigh device 10 is free to move in the vertical direction during loading and unloading of the load cells without obstruction by the transition rails.

Figure 9A:
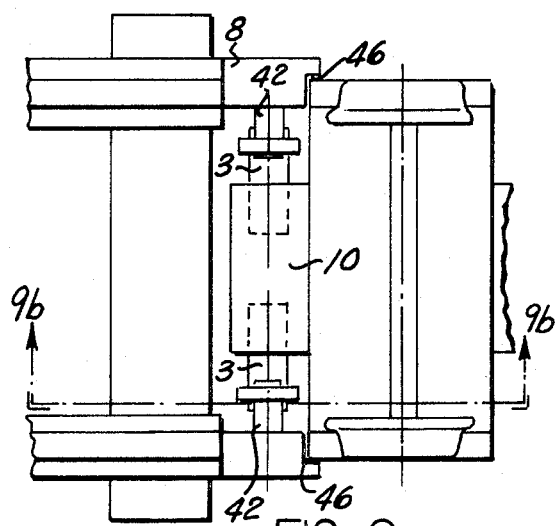
FIG. 9a is a top plan view of a modified form of the invention utilizing tension elements to support the weigh device.
Figure 9B:
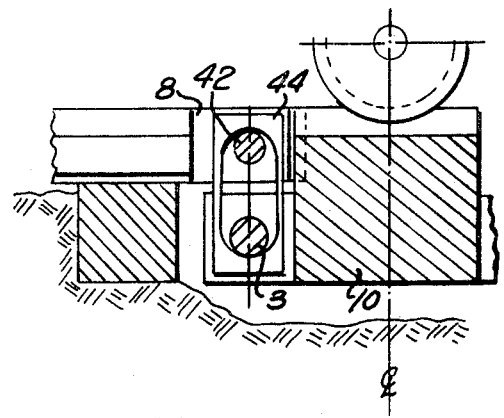

Another technique for supporting the vehicle supporting platform is illustrated in FIGS. 9a and 9b wherein each of the rail ends is provided with an extension 42 which projects at right angles to the rails. Similarly, the load cells 3 extend from the weigh device 10 at right angles to the rails. Suitable tension elements in the form of links 44 interconnect the projections 42 and the load cells 3. As is apparent from FIG. 9b, the contact surface defined by the openings in the links 42 have a relatively large rounded radius which engage the circular periphery of the projections 20 and the load cells 3 such that an essentially friction free, swinging support for the weigh device 10 is provided. This swingable support enables the weigh platform to be readily displaceable in all directions in a horizontal plane and provides, in effect, a self-centering support which returns the weigh device to a centered position. Suitable stops 46 on the rail ends provide limits for the movement of the weigh device, both longitudinally and transversely of the rail. By suitable dimensioning of the spacing between the stops 46, the magnitude of the side loading which can be exerted on the load cells can be limited to acceptable values.

Where it is desired, for example, to utilize the system of FIG. 9a and 9b in weighing a two axle car by using two such devices, the vehicle supporting platforms of the two devices should be connected by a suitable separator member which maintains a constant distance between the two supporting platforms. In this manner, undesirable friction between the supporting platform and the stops 46 which might result by the swinging movement of the two supporting platforms in opposite directions is avoided.

The links 44 are but one example of one suitable type of tension stressed elements which may be used to support the platform. Other forms could be used. For example, a tension link with spherical bearings at either end might be used. Other examples are a wire rope or a thin solid link having low bending stiffness which would enable the platform to be readily displaceable in the horizontal plane.

FIGS. 10a–c show an embodiment wherein the normal rails are unbroken at the weighing station and the vehicle supporting platform members 11, 12 are disposed between the rails. The load is transmitted via the flanges of the vehicle wheel 5 to a removable wear rail 51 on the vehicle supporting members and is transmitted therefrom through the load cells 3, which are shear sensing transducers of type bending stressed beam and supported by a frame 52 resting on the rail foundation 53. The wear rail is provided with tapered end sections and a higher middle section so that a wheel passing over the scale will roll up-hill on the wear rail with its flange and when it is on the middle section it is entirely free from the rail and supported by the vehicle supporting platform. The two platform member 11, 12 are interconnected by means of a rigid but torsionally weak connection in the form of an I-beam 54.

From the foregoing it will be appreciated that the objects set forth above are fully achieved by the described weighing device. In each of the embodiments, the weigh device is suitably supported so that it can move with the rails and thereby adjust itself to the vehicle carried by the rails. In this manner, a properly defined force is applied to each of the load sensing devices wholly independent of any flexing of the rails or their supports. Moreover, since in the preferred form of the invention, the vehicle carrying platform is designed to replace a section of the normal rail, the described system is particularly well adapted to "in-motion" or dynamic weighing with a high degree of accuracy.

While each of the described forms of the invention contemplates a weigh device associated with both of the rails it is, of course, possible to utilize the same principles of the invention in a weigh device associated with only one of the rails. However, in such a system the measuring accuracy of the weigh device is reduced since the load distribution of the contents in the vehicle is an unknown factor.

While the invention has been described in connection with certain specific embodiments, neither the illustrated embodiments nor the terminology employed in describing them is intended to be limiting; rather, it is intended to be limited only by the scope of the appended claims.

Having thus described the invention, what is claimed is:

1. A system for weighing railway guided vehicles including:
   rail means including a pair of spaced apart rails adapted to cooperate with and support the wheels of a railway vehicle,
   each of said rails including longitudinally spaced apart first and second rail sections defining a space therebetween,
   a weigh device associated with said rail means,
   said weigh device including vehicle supporting means adapted to cooperate with and support the wheels of a railway vehicle,
   said vehicle support means being positioned in the space between said first and second sections of each of said rails and defining a generally coextensive vehicle supporting surface therewith,
   load sensing means operative to produce a signal corresponding to the magnitude of a load applied thereto,
   said load sensing means being supported by said rail means and operatively supporting said weigh device on said rail means whereby said weigh device is supported for movement with said rail means.

2. The system of claim 1 wherein said load sensing means comprise a plurality of stress sensing load cells,
   one end of each of said load cells being connected to said vehicle supporting means,
   the other end of each of said load cells being removably secured to said rails whereby said weigh device may be readily removed.

3. The system of claim 1 wherein said vehicle supporting means comprises a pair of platform members each having weigh rails supported thereon, and
   connection means interconnecting said platform members.

4. The system of claim 3 wherein said connection means includes means pivotably interconnecting said platform members whereby one platform member may pivot relative to the other platform member.

5. The system of claim 1 and further including transition rail means bridging the space between the ends of said rail sections and said vehicle supporting means.

6. The system of claim 5 wherein said transition rail means includes means for permitting movement of said vehicle supporting means in a vertical direction without significant restraint by said transition rail means.

7. The system of claim 13 wherein said transition rail means each comprises rail means having a stiff midsection and friction free joints on either side of said mid-section.

8. The system of claim 1 wherein said load sensing means comprise shear sensing load cells with the longitudinal axis of each of said cells extending generally parallel to the rails.

9. The system of claim 8 wherein each of said load cells is positioned on the neutral vertical axis of the rails.

10. The system of claim 8 wherein each of said load cells is offset from the neutral vertical axis of the rails.

11. The system of claim 8 wherein a single load cell is associated with each of said rails,
   said load cells providing a cantilevered support for said vehicle supporting means in the space between said rail sections.

12. The system of claim 1 wherein said load sensing means comprise shear sensing load cells with the longitudinal axis of each of said cells extending transverse to said rails.

13. The system of claim 12 wherein one end of each of said load cells is supported in openings in the web of said rails.

14. The system of claim 12 wherein a load cell is provided at the end of each of said rail sections, and
   tension means supporting each load cell from its adjacent rail section.

15. The system of claim 14 wherein said tension means provides a flexible support for said load cells in a horizontal plane.

16. A device for use in a railway system for the weighing of railway guided vehicles, said railway system including a pair of spaced apart rails and ground supports for the rails, said device comprising:
   a pair of longitudinally extending vehicle supporting members each adapted to cooperate with and support the wheels of a railway vehicle,
   a plurality of load sensing means associated with each of said vehicle supporting members with said load sensing means being operative to produce a signal corresponding to the magnitude of a load applied thereto and,
   cross connection means extending transverse to said rails and interconnecting said pair of vehicle supporting members with the interconnection between said cross connection means and said vehicle supporting members permitting relative movement of said vehicle supporting members whereby each of said vehicle supporting members can adjust its position independently of the other vehicle supporting member.

17. The system of claim 16 wherein said load sensing means comprises a plurality of shear sensing load cells, and
   tension means supporting said load cells and the vehicle supporting means connected thereto on said means for shifting movement in a generally horizontal plane.

18. The system of claim 16 wherein said load sensing means comprise a plurality of shear sensing load cells,
   one end of each of said cells being connected to said vehicle supporting means,
   the other end of each of said cells being removably secured to said rails whereby said weigh device may be removed by detaching said load cells from said rails.

19. The system of claim 16 wherein said load sensing means comprises load cells supported by said ground supports with said vehicle supporting members being supported by said load cells.

20. The devices of claim 19 further including rigid support means adapted to rest on the ground supports with said load cell being supported by said rigid support means.

21. A weighing system for weighing railway guided vehicles and including a pair of spaced apart rails along which the vehicle is adapted to travel and ground supports for the rails, each of said rails including longitudinally spaced apart first and second rail sections defining a space therebetween and a weigh device positioned in the space in each of said rails the improvement comprising:

said weigh device including a pair of vehicle supporting means each positioned in the space between said first and second section of one of said rails and defining a generally coextensive vehicle supporting surface therewith, rigid support members supported by the ground supports adjacent the space in each of said rails, load sensing cells carried by said rigid support members with said load cells being operative to produce a signal corresponding to the magnitude of a load applied thereto, each of said vehicle supporting means being supported by said load sensing load cells.

22. The weighing system of claim 21 wherein said load cells are of the compression type and said vehicle supporting means are supported on the load application points of said load cells.

* * * * *